United States Patent [19]

Addleman et al.

[11] Patent Number: 4,737,032

[45] Date of Patent: Apr. 12, 1988

[54] SURFACE MENSURATION SENSOR

[75] Inventors: David A. Addleman, Pacific Grove; Lloyd A. Addleman, Big Sur, both of Calif.

[73] Assignee: Cyberware Laboratory, Inc., Pacific Grove, Calif.

[21] Appl. No.: 769,442

[22] Filed: Aug. 26, 1985

[51] Int. Cl.[4] ............................................. G01B 11/24
[52] U.S. Cl. .................................................. 356/376
[58] Field of Search ................. 356/1, 375, 376, 398; 358/107, 96, 101, 106; 364/468, 474, 476

[56] References Cited

U.S. PATENT DOCUMENTS

| | | | |
|---|---|---|---|
| 3,796,492 | 3/1974 | Cullen et al. | 356/398 |
| 3,918,816 | 11/1975 | Foster et al. | 356/1 |
| 3,986,774 | 10/1976 | Lowrey, Jr. et al. | 356/398 |
| 4,238,147 | 12/1980 | Stern | 356/376 |
| 4,297,034 | 10/1981 | Ito et al. | 356/398 |
| 4,529,305 | 7/1985 | Welford et al. | 356/30 |
| 4,529,316 | 7/1985 | DiMatteo | 356/376 |
| 4,531,837 | 7/1985 | Panetti | 356/376 |
| 4,563,094 | 1/1986 | Yamada | 356/401 |

*Primary Examiner*—F. L. Evans
*Attorney, Agent, or Firm*—Paul B. Fihe

[57] ABSTRACT

The invention is an apparatus having an improved arrangement of sensing and illumination elements for high speed, non-contact, three-dimensional mensuration of a surface. The surface is illuminated by a single plane of light producing a contour line. The line is viewed from two or more vantage points, alleviating shadowing from many types of large surface irregularities. The geometry of the apparatus is tolerant of moving surfaces, allows higher data rates and has great depth of field for the sensor.

5 Claims, 1 Drawing Sheet

SURFACE MENSURATION SENSOR

CROSS REFERENCE TO RELATED APPLICATION

This invention is related to application Ser. No. 06/764,302, filed on Aug. 12, 1985 by David A. Addleman and Lloyd A. Addleman titled Rapid Three-Dimensional Surface Digitizer.

BACKGROUND OF THE INVENTION

1. Field of the Invention

This invention relates to a contact-free surface mensuration method and apparatus which provides data to digital computers and more particularly apparatus capable of high data rates so that movement of the surface, such as occurs with live subjects, can be accommodated.

2. The Prior Art

Surface mensuration apparatus have been limited to use on inanimate subjects because of methods that are inherently slow. Examples are U.S. Pat. No. 4,089,608 and No. 4,373,804 which use mechanical scanning or mechanical error correction. To make a high resolution measurement of the surface of a living subject, such as the human head, measurement rates greater than 10,000 points per second are required. At these high rates image data can be collected before movement of the subject causes excessive distortion in the image.

A second problem with optical non-contact apparatus is shadowing of the light beam or obstruction of the sensor's view by features of the subject surface. U.S. Pat. No. 4,089,608 is an example which has this limitation.

Recently, in the referenced related application, a high speed method using multiple sources of illumination for alleviating shadowing has been disclosed. The geometry of this apparatus has several limitations.

The multiple data for the same surface point are obtained at different times, resulting in registration error if a line surface moves with respect to the mounting means between measurement times.

The multiple data for the same surface point must all be stored in memory, increasing the complexity and time required for storage.

For surfaces which have points lying behind the point of intersection of the light planes the sensor incorrectly identifies the light sources resulting in error.

SUMMARY OF THE INVENTION

It is an object of the invention to provide multiple viewing angles of a single contour line.

It is another object of the invention to combine the multiple views into a single optical image, minimizing the volume of digital data that must be stored.

It is another object of the invention to increase the resolution and measurement range.

Other objects and advantages of the present invention will become apparent as the description proceeds.

The invention provides a single fixed plane of light which illuminates the subject, producing a contour line on the surface of the subject. The contour line is viewed from two or more acute angles away from the light plane by an electronic sensor. Part of the apparatus provides for moving the subject relative to the light beam so that the light plane scans the entire surface to be measured. The relative motion is most generally rotation of the sensor about the surface, but some flat surfaces are better measured with a linear relative motion. The two or more viewing points can be implemented with an arrangement of mirrors and the images optically combined by means of a beamsplitter. The image plane of the sensor is tilted to provide correction for the lens system depth of field limitation.

DESCRIPTION OF THE PREFERRED EMBODIMENT

Figure 1:
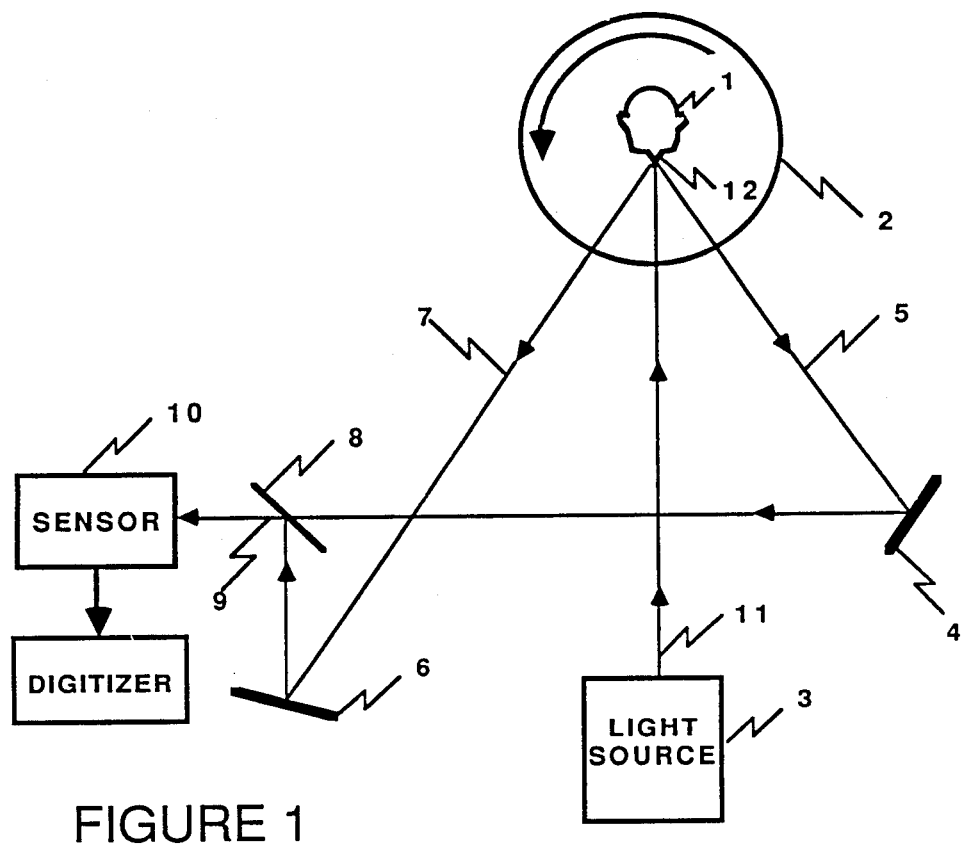
FIG. 1 illustrates the geometrical arrangement of the apparatus showing the light paths.

Refer to FIG. 1. The subject 1 whose surface is to be measured is mounted on a rotating table 2. A light source 3 generates a thin plane of light 11 perpendicular to the plane of the Figure and containing the axis of revolution of the table. Light plane generation methods are well known art. The contour line generated by the intersection of the light plane and the subject surface is viewed from both sides of a small angle away from the light plane by mirrors 4 and 6. The path of light from point 12 on the contour line is reflected from mirror 4, passes through the beamsplitter 8 to the sensor 10. The path of light 7 from the same point 12 is reflected by mirror 6 and again by the beamsplitter 8 to the sensor 10. Because the views along light paths 5 and 7 are of differing aspects of the subject surface, the combined image at the beamsplitter 8 is generally confused. However, for the geometry shown and with equal path lengths, those points and only those points within the light plane 11 will overlap, resulting in one contour line image which is the sum of the two views of the contour line on the subject 1. This is best proven by light ray tracing.

Figure 2:
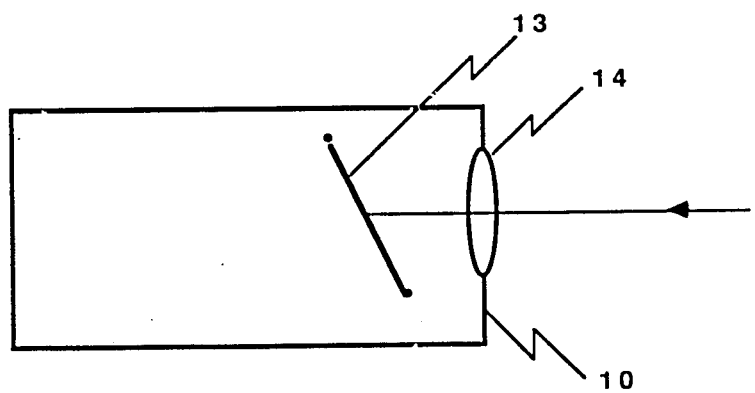
FIG. 2 illustrates the tilting of the sensor focal plane for correction of depth of field error.

Refer to FIG. 2. Because the two light path lengths vary in a regular manner as a function of the radius coordinate of the surface, the depth of field error of sensor lens 14, can be compensated for by tilting the focal plane 13 of the sensor.

More than two viewing directions can be combined by iteration of this preferred embodiment.

The details of the present invention are given by way of example and are not intended to limit the spirit or scope of the invention as set forth in the claims.

What is claimed is:

1. An electro-optical apparatus for use as a data input for apparatus performing high-speed non-contacting mensuration of three-dimensional surfaces comprising:
   a means for providing a plane of light intersecting said surface and producing a contour line;
   a means for moving said surface relative to said plane of light;
   a means for viewing said contour line from both sides of said plane of light;
   a means for combining the images of said contour line so that there is only one resultant image;
   a means for sensing said resultant image.

2. An apparatus as defined in claim 1 wherein said means for sensing includes a focal plane which is tilted to compensate for depth of field error.

3. An apparatus as defined in claim 1 wherein the means for viewing said contour line comprises a mirror on each side of said light plane, positioned to reflect the contour line images to said means for combining.

4. An apparatus as defined in claim 3 wherein said means for combining comprises a beamsplitter positioned to superimpose said contour line images by transmitting one image to said sensor and reflecting the second image to said sensor.

5. An apparatus as defined in claim 4 wherein said means for sensing includes a focal plane tilted to compensate for depth of field error.